United States Patent Office 3,505,283
Patented Apr. 7, 1970

3,505,283
ISOCYANATES AS THICKENING AGENTS FOR EPOXY RESINS
Albert J. Dalhuisen, San Jose, Calif., assignor to Merck & Co., Inc., Rahway, N.J., a corporation of New Jersey
No Drawing. Filed May 15, 1967, Ser. No. 638,602
Int. Cl. C08g 30/04
U.S. Cl. 260—47          8 Claims

ABSTRACT OF THE DISCLOSURE

An hydroxyl containing epoxy resin which contains carboxylic acid anhydride hardening agents and di- and polyisocyanates as chemical thickeners.

SUMMARY

This invention is concerned with a novel composition of matter comprising hydroxyl containing epoxy resins. More particularly, it is concerned with a composition of matter comprising an hydroxyl containing epoxy polymer or monomer, carboxylic acid anhydride hardening agents therefor and an isocyanate as a chemical thickening agent for the epoxy materials.

Epoxy resins are generally commercially available materials which find use in various applications. To mention a few, they are used in surface coatings, pipe parts, for casting tools and dies and for encapsulation of electrical parts. During the preparation of such articles, it has been found desirable to impart additional physical properties to the epoxy resin used so as to permit efficient and technically superior production techniques. The use of an epoxy-isocyanate composition which rapidly increases in viscosity is an important factor in permitting the desired production techniques. The more rapid increase of viscosity permits the resulting thickened epoxy to be used sooner after mixing and thereby reduces the amount of material held in inventory; this affords production economies.

It is an aspect of this invention to provide isocyanates which when combined with an epoxy resin-anhydride hardener formulation cause a surprisingly rapid viscosity increase in the composition obtained. This is achieved in a manner so that the thickened product is neither hard nor gelled but possesses an increased viscosity resulting in improved handling and processing of the heat curable resin mixture especially prior to and during curing. The thickened material can be kept at room temperature for a period of at least 1 day without a significant change in viscosity or the forming of a gel. The thickened product can be cured by heating or by microwaves.

The chemically thickened and thermoplastic properties of the thickened product and its stability at room temperature make it suitable for producing the thickened material into sheet form. The sheet is soft and pliable and can be cut easily to the size and shape which is most suitable and most economic for use in the mold in which the material is to be ultimately cured. Scraps left after cutting can again be worked into sheet material, thus making it possible to reduce material losses.

If the material has been applied to—and thickened on—a cloth, then this can be cut to the desired shape and size to fit the mold.

If fillers, reinforcing agents, or cloth are used, then this thickened resin provides superior hiding of these materials. In this manner, the surface of the cured product shows little or no presence of these materials.

The properties of the thickened product are such that during the heat curing, good flow is achieved in the mold. In this manner the mold is filled properly and the cured product shows great performance uniformity for many different sizes and shapes of cured product.

Further objects will become apparent from the following description of the invention.

The hydroxyl containing epoxy resins useful as starting materials in the present invention are normally derived from epichlorohydrin, or similar materials and di- or polyhydroxy phenols, or di- and polyhydric alcohols. The resins would also include aliphatic epoxy resins based on polyglycols and hydroxyl containing flame retardant resins containing halogen or phosphorus. It is intended that the terms di- or polyhydroxy phenols include the mononuclear as well as the polynuclear phenols. The term dihydric alcohols is intended to include glycols, i.e. compounds containing two hydroxy groups such as ethylene glycol and polyhydroxy compounds such as glycerine and the like. A commonly used epoxy resin is prepared from p,p'-isopropylidenediphenol (bisphenol A) and epichlorohydrin. As illustrative of the epoxy resin which may be used in accordance with the invention, there may be mentioned Epotuf 37–140, a composition prepared from epichlorohydrin and bisphenol A. This epoxy polymer has an oxirane equivalent of 185–200 and is manufactured and sold by Reichhold Chemicals, Inc. Epon 828 manufactured by Shell Chemical Co. is another epoxy polymer of similar type.

One or more epoxy monomers may be present in the system. However, there must be at least one type of epoxy monomer in the system which contains at least one hydroxyl group attached to the epoxy molecule.

The anhydride hardeners useful in curing these resins are well known and include agents such as phthalic anhydride, maleic, succinic, tetrahydrophthalic anhydride, hexahydrophthalic anhydride, dodecenylsuccinic anhydride, Nadic Methyl Anhydride, and the like. The novel compositions may also contain other constituents such as fillers, diluents, reactive or unreactive solvents, etc. Virtually any type of anhydride may be employed, including halogenated derivatives. It is common in the art to use a mixture of anhydrides. The type and amount of anhydride(s) and epoxy resin(s) is such that when thickened with isocyanate the resin should not be too hard or gelled. Normally, the equivalent ratio of epoxy to anhydride ranges from about 1:1 to 1:0.85, however, anhydride amounts as low as a ratio of 1:0.5 can be used, depending on processing conditions, type of catalyst, and desired properties.

It has also been determined that dibutyltin dilaurate and magnesium compounds such as MgO, $Mg(OH)_2$, magnesium basic carbonate and where the above magnesium compounds have been pretreated with isocyanate are effective catalytic agents in the chemical thickening reaction. The novel compositions of the invention may also contain other constituents that are conventionally employed in epoxy resin formulations such as diluents, solvents, fillers, reinforcing agents, coupling agents, UV stabilizers, surfactants or pigments, etc.

It has been determined that desirable chemical thickening of an epoxy-anhydride formulation can be achieved by aromatic or aliphatic isocyanates having at least 2 reactive isocyanate groups per molecule. Examples of isocyanates that may be employed in the practice of the invention include lysine diisocyanate methyl ester; tolylene-2,4-diisocyanate; diphenylmethane diisocyanate; 3,3'-dimethyl-4,4'-biphenylene diisocyanate; Niax Tolylene Diisocyanate, a commercial mixture of diisocyanate isomers manufactured by Union Carbide Co. which contains 80% of the 2,4-isomer and 20% of the 2,6-isomer; polymethylene polyphenylisocyanate, a polymeric isocyanate produced by the Upjohn Co. and sold under the trade name PAPI. The particular isocyanate is not critical, any aromatic or aliphatic isocyanate having at least two reactive isocyanates would produce the desired effect and is contemplated with the scope of the invention. The amount of isocyanate employed is that amount which produces the desired degree of thickening. However, it is desirable that the amount be such as to completely react with substantially all moisture and all hydroxyl present in the mixture with litle excess isocyanate remaining. The amount employed shall usually vary within the range 2–40 parts per hundred parts of epoxy resin or monomer (phr.), the preferred range being about 5–20 phr. For reasons explained below the amount of isocyanate should be sufficient to react with the moisture content of the system, apart from the isocyanate required for the actual thickening, whereby 2 isocyanate groups are required for every $H_2O$ molecule.

Although it is not desired to limit the invention to any particular theory it is believed that the surprising viscosity increase in the epoxy resin to be due to a reaction between the di- or polyisocyanate and the hydroxyl groups of the epoxy molecules. In this manner, chains are formed in which epoxy molecules are joined through a reaction with the isocyanate. This reaction is believed to be responsible for the production of the highly viscous essentially thermoplastic material.

Initial experiments involving the use of isocyanates as chemical thickeners for epoxy resin-anhydride hardener systems presented problems since the isocyanates tend to react with $H_2O$ to form $CO_2$. If the $CO_2$ gas is liberated during a high viscosity stage, it would be extremely difficult for it to escape from the resin, resulting in voids in the cured plastic. This undesirable $CO_2$ formation at a high viscosity stage was eliminated by providing for a reaction sequence whereby the isocyanate reacts first with all available moisture before a large viscosity increase starts or before gelling occurs. This is achieved by choosing a temperature range in which the isocyanate reacts relatively quickly with water but more slowly with the hydroxyl of the epoxy. The next stage in the reaction involves the reaction of the isocyanate with the hydroxyl groups of the epoxy molecules. Isocyanates having at least two reactive isocyanate groups per molecule are required for the thickening reaction. These isocyanates shall also react with the moisture in the system. However, a monoisocyanate may be included in the system for the reaction with the moisture. By choosing a monoisocyanate which is considerably more reactive with water than the di- or polyisocyanate which is used for thickening, the reaction with the moisture occurs more readily before a high viscosity stage is achieved. The proper reaction sequence is obtained, if only one isocyanate is used for thickening as well as the reaction with moisture, by choosing such a temperature that the reaction with water proceeds rapidly while the thickening reaction proceeds slowly. One may also employ a monoisocyanate in an amount sufficient to react with all moisture present in the mixture. After the mixture is heated and mixed and all the water has reacted with the monoisocyanate, the di- or polyisocyanate used to produce the thickening effect is introduced and the mixing and heating continued until the desired degree of thickening is obtained. An example of a mono-isocyanate that may be employed to reduce the moisture content of the system is phenyl isocyanate.

It is desirable that following the isocyanate-epoxy reaction, there should not be significant excess isocyanate remaining since it has been observed that excess isocyanate has a tendency to affect the final epoxy curing resulting in void formation during gelling.

The novel composition of matter according to the present invention may be prepared by mixing or blending together the epoxy, anhydride hardener and isocyanate. The mixing or blending can be achieved by any conventional method known to the art. Vigorous mixing is not required. Any heating system which will not cause localized hot spots may be employed for the reaction between the isocyanate and water and the isocyanate and hydroxyl containing epoxy. All ingredients are mixed or blended together, then they are heated and mixed at such a temperature that the isocyanate reacts with the moisture and hydroxyl, however avoiding any substantial reaction between the epoxy resin-anhydride hardener; the objective being to achieve chemical thickening without curing the system. The temperature range at which thickening but not final curing occurs ranges from about 50° C. to about 200° C. A preferred temperature range is from about 85° C. to 135° C. The duration of the heating is such to preclude final curing although effecting chemical thickening. Generally, heating from about 20 minutes to about 6 hours at 125° C. shall produce the desired thickening effect. The heating may be continued until all isocyanate has reacted or the heat may be discontinued after a portion of the isocyanate has reacted. In the latter case the resin formulation will require a second heat treatment or aging at room temperature in order to reach the final viscosity at which stage little or no reactive isocyanate should remain. For example, when the resin is to be applied to a cloth, it is advantageous to apply the mixture to the cloth before the final viscosity is reached since that shall result in good wetting of the cloth by the resin mixture. A further and final thickening of the resin mixture may then by obtained by the application of heat, aging at room temperature or by the application of microwaves. Final curing of the resin mixture is achieved in the normal manner by heating.

The method of incorporation and order of addition of the components can be varied without significantly affecting the reaction. For example, it is possible to add the isocyanate to a preheated and premixed mixture of the epoxy resin and hardener or the isocyanate can be added to the cold mixture and heat applied.

In order to demonstrate the use of di- and polyisocyanates as thickening agents for epoxy resins, the following experiments were performed. It should be noted however that the following examples are given for the purpose of illustration and not by way of limitation.

EXAMPLES

To an epoxy resin (Epon 828) prepared from epichlorohydrin and bisphenol A and manufactured and sold by Shell Chemical Co. is added Nadic Methyl Anhydride, a liquid organic anhydride manufactured and sold by Allied Chemical Corp. The mixture of epoxy resin and anhydride hardener is blended together and heated until the temperature at which the resin is to be thickened is reached. At this temperature the isocyanate is added. The isocyanate employed in this particular example is polymethylene polyphenylisocyanate manufactured and sold under the trade name PAPI by the Upjohn Company. During the thickening the temperature is kept to within ±2° C. of the reported temperature and the mixing continued during the thickening process. The epoxide to anhydride equivalent ratio used in these experiments is 1:1. The compositions, both with and without the isocyanate were prepared in the identical manner.

The viscosity was measured with a Gardner Bubble Viscometer, Series U-Z6. This instrument measures the speed of an air bubble traveling upward through a tube filled with the sample. Numbers and letters are used for viscosity values; a higher letter or number indicates a higher viscosity. The highest viscosity obtained is designated as "no flow" which indicated that no flow occurred in the viscosity tube within 60 minutes after turning the tube. The viscometer was maintained at 25° C., whereas the samples were measured when at 25° C. and in some cases at 100° C.

Gel time was tested by probing the cured resin with a spatula. Gel times of the thickened mixtures were determined as an indication of the speed of the epoxy-anhydride curing reaction.

The following results were obtained.

EXAMPLE I

Epon 828—200 gms.
Nadic Methyl Anhydride—180 gms.
Gardner viscosity at 25° C., after 3 hours at room temperature—X
Gardner viscosity at 25° C., after heating during 6 hours at 175° C.—>Z-6
Gardner viscosity at 100° C., after heating during 6 hours at 175° C.—<U
Gel time at 175° C.—>40 hours

EXAMPLE II

Epon 828—200 gms.
Nadic Methyl Anhydride—180 gms.
PAPI—12.5 gms.
Thickening reaction temperature—175° C.
Gardner viscosity at 25° C.:

After 30 minutes heating—Z-5
After 1 hour heating—Z-6
After 2 hours heating—>Z-6
After 3 hours heating—>Z-6
After 4 hours heating—>Z-6
After 6 hours heating—No flow Gardner viscosity at 100° C.:

After 4 hours heating—<U
After 6 hours heating—Z-1

Gel time at 175° C. after heating 6 hours at 175° C.— 5 hours

The substantially greater viscosity displayed by the formulation of Example II containing the isocyanate material is clearly evident when compared with the same preparation without the isocyanate. It should be further noted that in addition to the substantial viscosity increase, the thickened product demonstrates excellent stability at room temperature. For example, the thickened samples with viscosities of Z-5 and Z-6 at 25° C. and a viscosity of Z-1 at 100° C. did not show a viscosity change when maintained for at least 5 days at room temperature.

It is also significant that the formulation containing the isocyanate causes a reduction of the gel time and thus offers the economic advantage of a reduced heating period for curing the resin.

Similar results are obtained when other hydroxyl containing epoxy resins, anhydride hardeners and aromatic and aliphatic isocyanate thickeners are employed.

Although this invention has been described with reference to particular embodiments thereof, it is to be understood that the invention is susceptible to other modifications which appear within the spirit of the invention and the scope of the appended claims.

What is claimed is:

1. A process of increasing the viscosity of an hydroxyl containing 1,2-epoxy resin which comprises heating from about 50° C. to about 200° C. a mixture of said hydroxyl containing epoxy resin, an anhydride hardener and from about 2 to about 40 parts per hundred parts of resin of an aliphatic or aromatic isocyanate containing at least two isocyanate groups, the heating being conducted at a time and temperature such as to thicken the epoxy resin without producing substantial final curing and the amount of isocyanate is such that substantially no excess of isocyanate remains at the conclusion of the thickening reaction.

2. The process of claim 1 wherein the equivalent ratio of epoxy to anhydride is from about 1:1 to 1:0.5.

3. The process of claim 1 wherein the isocyanate is selected from the group consisting of polymethylene polyphenylisocyanate, lysine diisocyanate methyl ester, tolylene-2,4-diisocyanate, tolylene diisocyanate isomeric mixture, diphenylmethane diisocyanate and 3,3'-dimethyl-4,4'-biphenyl diisocyanate.

4. The process of claim 1 wherein the isocyanate is polymethylene polyphenylisocyanate.

5. A process of increasing the viscosity of an hydroxyl containing 1,2-epoxy monomer which comprises heating from about 50° C. to about 200° C. a mixture of said hydroxyl containing epoxy monomer, an anhydride hardener and from about 2 to about 40 parts per hundred parts of monomer of an aliphatic or aromatic isocyanate containing at least two isocyanate groups, the heating being conducted at a time and temperature such as to thicken the epoxy resin without producing substantial final curing and the amount of isocyanate is such that substantially no excess of isocyanate remains at the conclusion of the thickening reaction.

6. The process of claim 5 wherein the equivalent ratio of epoxy to anhydride is from about 1:1 to 1:0.5.

7. The process of claim 5 wherein the isocyanate is selected from the group consisting of polymethylene polyphenylisocyanate, lysine diisocyanate methyl ester, tolylene-2,4-diisocyanate, tolylene diisocyanate isomeric mixture, diphenylmethane diisocyanate and 3,3'-dimethyl-4,4'-biphenyl diisocyanate.

8. The process of claim 5 wherein the isocyanate is polymethylene polyphenylisocyanate.

References Cited

UNITED STATES PATENTS

| 3,267,077 | 8/1966 | Windemuth et al. | 260—77.5 |
| 3,268,477 | 8/1966 | Mueller | 260—47 |
| 3,316,191 | 4/1967 | Montesano | 260—2 |
| 3,317,480 | 5/1967 | Fetscher et al. | 260—2 |
| 3,404,195 | 10/1968 | Weinrich | 260—47 |

HAROLD D. ANDERSON, Primary Examiner

U.S. Cl. X.R.

260—2, 77.5